US012697883B2

(12) United States Patent
Barth et al.

(10) Patent No.: US 12,697,883 B2
(45) Date of Patent: Aug. 4, 2026

(54) METHOD FOR OPERATING A MOTOR VEHICLE, AND CORRESPONDING MOTOR VEHICLE

(71) Applicant: AUDI AG, Ingolstadt (DE)

(72) Inventors: Alexander Barth, Heideck (DE);
Adrian Mihailescu, Ingolstadt (DE);
Otto Pickhahn, Penzberg (DE)

(73) Assignee: Audi AG, Ingolstadt (DE)

( * ) Notice: Subject to any disclaimer, the term of this patent is extended or adjusted under 35 U.S.C. 154(b) by 91 days.

(21) Appl. No.: 18/792,300

(22) Filed: Aug. 1, 2024

(65) Prior Publication Data
US 2025/0042258 A1      Feb. 6, 2025

(30) Foreign Application Priority Data

Aug. 3, 2023    (DE) .......................... 102023120572.2

(51) Int. Cl.
B60L 7/10              (2006.01)
(52) U.S. Cl.
CPC ............. B60L 7/10 (2013.01); B60L 2240/12 (2013.01); B60L 2240/423 (2013.01); B60L 2240/54 (2013.01); B60L 2240/68 (2013.01); B60L 2250/28 (2013.01)
(58) Field of Classification Search
CPC .. B60L 7/10; B60L 2240/12; B60L 2240/423; B60L 2240/54; B60L 2240/68; B60L 2250/28; B60L 7/18
See application file for complete search history.

(56) References Cited

U.S. PATENT DOCUMENTS

| | | | |
|---|---|---|---|
| 10,377,242 B2 | 8/2019 | Murase | |
| 2015/0069938 A1 | 3/2015 | Hisano | |
| 2016/0318421 A1* | 11/2016 | Healy | ..................... B60L 58/10 |
| 2017/0072941 A1* | 3/2017 | White | ................... B60W 30/02 |
| 2021/0162869 A1* | 6/2021 | Nakamura | .......... B60L 15/2045 |

FOREIGN PATENT DOCUMENTS

| | | |
|---|---|---|
| DE | 102010004846 A1 | 3/2011 |
| DE | 102013206913 A1 | 10/2014 |
| DE | 102015223006 A1 | 5/2017 |
| EP | 3150423 A1 | 4/2017 |

* cited by examiner

*Primary Examiner* — Alan D Hutchinson
(74) *Attorney, Agent, or Firm* — Seed Intellectual Property Law Group LLP

(57) ABSTRACT

A method for operating a motor vehicle, which has at least one electric machine, is provided and may include providing a recuperation torque aimed at decelerating the motor vehicle at least temporarily, setting the recuperation torque to a target value, and selecting a default value for the recuperation torque from a plurality of default values. A first recuperation operating mode may be carried out when a default value is selected on the operating element which corresponds to a recuperation torque other than zero. The first recuperation operating mode may be switched to a second recuperation operating mode when a default value is selected on the operating element which corresponds to a recuperation torque of zero and when an accelerator pedal of the motor vehicle is actuated. The disclosure further relates to a motor vehicle.

10 Claims, 1 Drawing Sheet

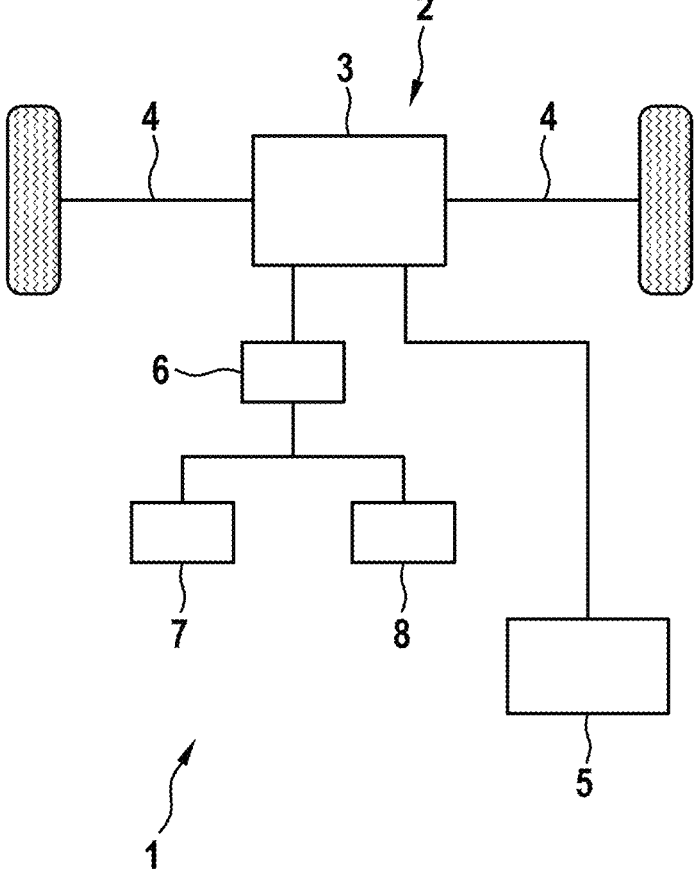

METHOD FOR OPERATING A MOTOR VEHICLE, AND CORRESPONDING MOTOR VEHICLE

BACKGROUND

Technical Field

The disclosure relates to a method for operating a motor vehicle having at least one electric machine, such as an electric machine configured to provide a recuperation torque, and further relates to a motor vehicle.

Description of the Related Art

Document EP3150423A1 discloses a regenerative brake control device of a vehicle which is designed to control a rotary electric motor, which is designed to drive wheels at a regeneration ratio corresponding to a selected regeneration stage in order to obtain a regenerative brake force, comprising: a selection section which is manually actuated to select a regeneration stage from a plurality of regeneration stages which have been set; and a control section which is designed to perform a control such that, when a predetermined operation is performed on the selecting section, a regeneration stage in which the predetermined operation has not been performed on the selecting section is automatically changed to another regeneration stage.

BRIEF SUMMARY

The present disclosure provides a method for operating a motor vehicle which may enable a reliable and flexible recuperation operation of the motor vehicle.

According to the disclosure, a method for operating a motor vehicle is provided, wherein it is provided that a switch is made from a first recuperation operating mode to a second recuperation operating mode when a default value is selected on an operating element which corresponds to a recuperation torque of zero, and an accelerator pedal of the motor vehicle is additionally actuated.

It should be noted that the exemplary embodiments explained in the description are not limiting; rather, variations of the features disclosed in the description, the claims, and the FIGURES may be implemented.

The motor vehicle has at least one electric machine, which may be part of a drive device of the motor vehicle. The drive device serves to drive the motor vehicle, such that the drive device provides a drive torque aimed at driving the motor vehicle. The electric machine may be present, for example, as a drive unit of the drive device. In addition to the electric machine, the drive device may have one or more further drive units, for example one or more further electric machines and/or an internal combustion engine. The drive unit or the drive units may at least be temporarily drivingly coupled to at least one wheel axle of the motor vehicle. In this respect, the motor vehicle may be driven at least temporarily by way of the at least one electric machine.

The drive torque may be aimed both at accelerating and at decelerating the motor vehicle. A driving speed of the motor vehicle may thus be increased or reduced by way of the drive device. To decelerate the motor vehicle, the recuperation torque may be provided at least temporarily by way of the electric machine. The recuperation torque is to be understood as a drive torque directed at decelerating the motor vehicle, which may be generated by the electric machine. This may take place by converting the kinetic energy of the motor vehicle into electrical energy by way of the electric machine. The electric machine may thus be used at least temporarily in a recuperation operating mode as a recuperation brake in order to decelerate the motor vehicle.

It should be noted that the motor vehicle does not have to be decelerated exclusively by way of the electric machine during recuperation operation, although this can of course be provided. Rather, the motor vehicle may also be decelerated by way of a service brake of the motor vehicle, for example, using a wheel brake assigned to the at least one wheel axle, and/or—if present—by way of one of the other drive units. In other words, during recuperation operation the motor vehicle may be decelerated at least partially or completely by way of the electric machine.

The recuperation torque provided by the electric machine during recuperation operation may be set to the target value. This may be accomplished by way of power electronics, which control the electric machine accordingly. The recuperation torque may preferably be regulated or set to the target value in a regulated manner. By selecting the target value accordingly, the recuperation torque and thus the deceleration of the motor vehicle caused by the electric machine may be set.

The motor vehicle may also have the operating element, by way of which the default value for the recuperation torque may be selected from a plurality of default values. Preferably, the plurality of default values may each correspond to different recuperation torques, so that different default values for the recuperation torque may be selected on the operating element. In this respect, the deceleration caused during recuperation operation may be set or selected using the operating element.

At least one of the plurality of default values may correspond to a recuperation torque of zero. For example, a first default value may correspond to a recuperation torque of zero and a second default value may correspond to a recuperation torque that is different from zero. Preferably, the second default value may correspond to a recuperation torque that is greater than zero. In some embodiments, the plurality of default values may comprise further default values that correspond to successively larger recuperation torques.

The operating element may be arranged in an interior space of the motor vehicle and may be present, for example, in the form of one or more shift paddles on a steering wheel of the motor vehicle and/or as a selector lever. Additionally or alternatively, the operating element may be present in the form of a multifunction display, which may be, for example, part of an instrument panel and/or a driver assistance device. By actuating the operating element accordingly, the default value may be selected from the plurality of default values. For example, by successively actuating the operating element, gradually larger or smaller default values for the recuperation torque may be selected. In this respect, the default values may be gradually increased by gradually actuating the operating element, starting from the first default value, which corresponds to a recuperation torque of zero. Accordingly, the default value may be gradually decreased starting from the second or a higher default value towards the first default value.

The recuperation operation may provide for at least two recuperation operating modes, namely the first recuperation operating mode and the second recuperation operating mode. The recuperation operating mode may be selected as a function of the default value selected on the operating element. The recuperation operating mode may be switched off using the operating element, so that no recuperation operation is carried out, at least temporarily.

In the first recuperation operating mode, the target value may be determined as a function of the default value. The default value may be used as the target value in the first recuperation operating mode. For example, the target value may be set in such a way that the recuperation torque provided by the electric machine is set or regulated to the recuperation torque corresponding to the default value. In the first recuperation operating mode, the target value of the recuperation torque may thus be specified by way of the operating element.

In the first recuperation operating mode, the motor vehicle may thus be decelerated with a default recuperation torque, which may be manually specified, in some embodiments, by a driver of the motor vehicle using the operating element. In the first recuperation operating mode, by setting the target value as a function of the default value, a driving behavior may be simulated that is similar to that of a motor vehicle with an internal combustion engine in towing mode. In such a motor vehicle, internal friction torques of the internal combustion engine may cause a braking effect and thus a deceleration of the motor vehicle in towing mode, which is also referred to as an engine brake. In an electrically powered motor vehicle, such as a motor vehicle that can be driven exclusively electrically, the corresponding internal friction torques of an internal combustion engine are not present. In the first recuperation operating mode, this braking effect may be simulated by way of the electric machine. The driving behavior of the motor vehicle in the first recuperation operating mode may therefore be similar to the driving behavior of a motor vehicle with an internal combustion engine in towing mode. By increasing the default value gradually by way of the operating element, an increasing braking effect of an engine brake may be simulated, which occurs in a motor vehicle with an internal combustion engine during a gradual downshift of a gear change transmission in towing operation.

The first recuperation operating mode may be carried out when a default value is selected on the operating element that corresponds to a recuperation torque that is different from zero. The first recuperation operating mode may be carried out when a default value is selected on the operating element that corresponds to a recuperation torque that is greater than zero. In the first recuperation operating mode, the target value may thus correspond at least temporarily to a recuperation torque that is different from zero. This may be the case as long as the accelerator pedal of the motor vehicle is not actuated, that is to say as long as there is no explicit acceleration and/or braking request from the driver.

In the second recuperation operating mode, however, the target value may be determined as a function of the driving speed of the motor vehicle. Thus, the target value of the recuperation torque in the second recuperation operating mode may be determined independently of the default value. The recuperation torque may therefore not be manually specified in the second recuperation operating mode, but may instead be determined automatically. The target value may be set, for example, in such a way that the driving speed of the motor vehicle is adapted to a driving speed of another vehicle driving ahead and/or to a route. The motor vehicle may preferably be equipped with appropriate equipment to recognize the other vehicle driving ahead and/or the route. Adapting the driving speed to the route is understood to mean that the driving speed is reduced if this appears appropriate in view of the route. For example, the driving speed may be reduced in anticipation in the second recuperation operating mode when the motor vehicle approaches a curve, a road junction and/or an area of urban development. The information required about the route may be provided, for example, by a driver assistance system.

As described above, in the first recuperation operating mode the target value may be set as a function of the default value as long as the accelerator pedal is not actuated, that is to say as long as there is no explicit acceleration and/or braking request from the driver. If, however, the accelerator pedal is actuated, a determination may be made that the target value is no longer set as a function of the default value. In some embodiments, a determination may be made for the first recuperation operating mode to be interrupted at least temporarily if the accelerator pedal is actuated while the first recuperation mode is being carried out in order to set the drive torque and/or, if applicable, a brake force of the service brake in accordance with the driver's acceleration and/or braking request. Additionally or alternatively, the recuperation torque provided by the electric machine may be used to produce the brake force.

If the accelerator pedal was actuated while the first recuperation operating mode was carried out and said first recuperation operating mode was thus interrupted, a switch to the second recuperation operating mode may be carried out or a recuperation operation may no longer be carried out as soon as it is determined that the accelerator pedal is no longer actuated. Such a procedure may be perceived as undesirable by the driver. Therefore, the first recuperation operating mode may be continued after the first recuperation operating mode has been interrupted as soon as a determination is made that the accelerator pedal is no longer actuated. The first recuperation operating mode may be continued as long as a default value is selected on the operating element that corresponds to a recuperation torque other than zero, and the accelerator pedal is not actuated.

According to the disclosure, a switch from the first recuperation operating mode to the second recuperation operating mode may be carried out if the default value corresponding to a recuperation torque of zero is selected on the operating element and the accelerator pedal of the motor vehicle is additionally actuated. In some embodiments, the accelerator pedal must be actuated at least temporarily within a certain period of time after selecting the default value corresponding to a recuperation torque of zero in order to switch to the second recuperation operating mode. If, however, the accelerator pedal is not actuated within said certain period of time, the selection of the default value may preferably be cancelled and instead the first recuperation operating mode may be continued using the previously selected default value.

In order to switch to the second recuperation operating mode, simply selecting the default value corresponding to a recuperation torque of zero on the operating element is not sufficient. Rather, the accelerator pedal must be actuated in addition in order to carry out the switch to the second recuperation operating mode. Conversely, simply actuating the accelerator pedal in the first recuperation operating mode is not sufficient in order to interrupt the first recuperation operating mode and to switch to the second recuperation operating mode. Rather, to switch from the first recuperation operating mode to the second recuperation operating mode, the default value corresponding to a recuperation torque of zero must also be selected on the operating element.

This procedure enables a particularly reliable and flexible recuperation operation. Thus, on the one hand, after a temporary actuation of the accelerator pedal, the first recuperation operating mode is continued as long as the default value corresponding to a recuperation torque of zero is set on the operating element. This corresponds to a behavior expected by the driver, since, for example, after temporarily accelerating or decelerating the vehicle by actuating the accelerator pedal, the first recuperation operating mode is continued and not ended.

On the other hand, any unintentional switch to the second recuperation operating mode is prevented if the default value corresponding to a recuperation torque of zero is inadvertently selected on the operating element in the first recuperation operating mode. If a switch to the second recuperation operating mode were made in such a case, this could lead to unexpected driving behavior, since the recuperation torque in the second recuperation operating mode is no longer set as a function of the default value. Therefore, the change to the second recuperation operating mode is only carried out if the switch is also confirmed by actuating the accelerator pedal.

The target value in the first recuperation operating mode may additionally be set as a function of the driving speed. Thus, the target value may be determined both as a function of the default value and as a function of the driving speed. In some embodiments, the target value may be increased beyond the default value as a function of the driving speed. For example, a smaller first target value may be selected as the target value for a lower first driving speed, which is preferably greater than zero, and a larger second target value may be selected as the target value for a higher second driving speed. Preferably, at least the larger second target value may be greater than the default value. Of course, both the smaller first target value and the larger second target value may each be greater than the default value. In other words, the recuperation torque in the first recuperation operating mode may have a speed-dependent component that increases as the driving speed increases. This may result in a particularly flexible recuperation operation, since the braking effect of the recuperation operation is correspondingly greater at a higher driving speed.

Additionally or alternatively, the target value may be increased beyond the default value if the recuperation torque corresponding to the selected default value is not sufficient to adapt the driving speed to the driving speed of the vehicle ahead and/or to the route. In other words, the speed-dependent component of the recuperation torque may be adapted in anticipation beyond the default value to the driving speed of the vehicle ahead and/or the route. This may result in a particularly efficient and reliable recuperation operation.

The target value may be set such that the driving speed is set to a target driving speed. This may preferably be provided both in the second recuperation operating mode and in the first recuperation operating mode if the target value is additionally set as a function of the driving speed. Alternatively, this may only be provided in the second recuperation operating mode. The target driving speed is understood to mean a driving speed that the motor vehicle should not exceed and/or not fall below. The target value may be set in such a way that the driving speed of the motor vehicle is set or regulated towards the target driving speed.

The motor vehicle may preferably be decelerated by way of the recuperation torque provided by the electric machine when the driving speed is greater than the target driving speed. In some embodiments, this is done exclusively by way of the recuperation torque. The target value may be set accordingly in order to reduce the driving speed to the target driving speed, but not to fall below the target driving speed. Conversely, the recuperation torque may preferably be reduced when the driving speed is less than the target driving speed. This may occur particularly when the route has a gradient. Such a reduction of the recuperation torque may enable a particularly reliable recuperation operation, since the driving speed is always adjusted towards the target driving speed.

The target driving speed may be determined from a setting of the operating element and/or from a driver assistance device. The target driving speed may be set, for example, by way of the operating element and may therefore be specified by the driver. The operating element may have the setting by way of which the target driving speed may be set. For example, the target driving speed may be freely selected on the operating element. Preferably, the operating element may be configured to adopt the current driving speed as the target driving speed. This may enable particularly flexible recuperation operation.

Additionally or alternatively, the target driving speed may be determined by the driver assistance device. The driver assistance device may have, for example, a corresponding data set in which the target driving speed is stored. The data set may be, for example, map information from a navigation instrument. The driver assistance device additionally or alternatively may have a traffic sign recognition system that is configured to determine the target driving speed based on traffic signs arranged along the route. This may enable a particularly reliable recuperation operation.

An angle of inclination of the motor vehicle may be determined and the target value may be set as a function of the angle of inclination. The angle of inclination is to be understood, in particular, as an angle of inclination of a longitudinal center axis of the motor vehicle arranged in the direction of travel, in particular with respect to a geodetic coordinate system.

The angle of inclination may correspond approximately to an upward or downward gradient of a road on which the motor vehicle is moving. For example, a positive angle of inclination may correspond to an upward gradient and a negative angle of inclination may correspond to a downward gradient. The target value may be increased in case of a positive angle of inclination and/or reduced in case of a negative angle of inclination. Accordingly, the recuperation torque may be increased when the angle of inclination is positive or reduced when the angle of inclination is negative. This may enable a particularly flexible recuperation operation, since the brake effect is adapted to the upward or downward gradient.

The target value may be determined as a function of a further default value for the recuperation torque when the driving speed is greater than the target driving speed. This may preferably be done in the context of a third recuperation operating mode, which may be provided both in conjunction with the first recuperation operating mode and/or the second recuperation operating mode and also may be provided independently of these recuperation operating modes.

If the driving speed in the third recuperation operating mode exceeds the target driving speed, the target value may no longer be determined as a function of the default value and/or the driving speed, but rather as a function of said further default value, which may preferably be greater than the default value. Preferably, in the third recuperation operating mode, at least at times, there may be a greater recuperation torque than in the first recuperation operating mode and/or in the second recuperation operating mode.

The third recuperation operating mode may be carried out, in some embodiments, after a change in the target driving speed has taken place, such as to a lower target driving speed, for example, by way of the operating element and/or the driver assistance device. The third recuperation operating mode may be carried out until the driving speed again corresponds to the target driving speed. In other words, the third recuperation operating mode may be carried out in order to temporarily increase the recuperation torque after a change in the target driving speed beyond the recuperation torque provided in the first recuperation operating mode and/or the second recuperation operating mode.

The first recuperation operating mode and/or the second recuperation operating mode may then be continued, provided the third recuperation operating mode is carried out in conjunction with these recuperation operating modes. Alternatively, the recuperation operation may end. This procedure may enable a particularly flexible recuperation operation, with the driving speed being adapted to a changed target driving speed in a particularly efficient manner.

Said further default value may be selected from the plurality of default values. For example, the further default value may be selected from the plurality of default values on the operating element. At least two default values may thus be selected on the operating element, namely the default value and said further default value. Both the default value and said further default value may be selected independently of one another from the plurality of default values. Additionally or alternatively, said further default value may be freely selected.

Said further default value may preferably always be greater than the default value, as already mentioned above. Consequently, the default value corresponding to a recuperation torque of zero may not be selected as said further default value. Said further default value may therefore always correspond to a recuperation torque that is greater than zero. This may ensure that in the third recuperation operating mode, sufficient recuperation torque is always provided to reduce the driving speed to the target driving speed.

A difference in driving speed between the motor vehicle and a vehicle driving ahead may be determined and the target driving speed is set as a function of the difference in driving speed. The vehicle driving ahead has already been mentioned above.

The difference in driving speed may be determined, for example, by way of the driver assistance device. If the difference in driving speed is greater than zero, that is to say the driving speed of the motor vehicle is greater than the driving speed of the vehicle ahead, the distance between the motor vehicle and the vehicle ahead may then be reduced accordingly. Accordingly, the target driving speed may be set in such a way that a difference in driving speed of zero is achieved. Additionally or alternatively, the target driving speed may be adjusted in such a way that the distance is regulated to a default distance. In any case, the target driving speed may be selected contrary to the target driving speed determined from the setting of the operating element and/or by the driver assistance device, as long as the difference in driving speed is greater than zero.

However, if the difference in driving speed is less than zero, that is to say the driving speed of the motor vehicle is less than the driving speed of the vehicle ahead, the target driving speed may then be set independently of the difference in driving speed. In this case, for example, the target driving speed determined from the setting of the operating element and/or by the driver assistance device may be used. This may enable a particularly flexible recuperation operation.

The target value may be set as a function of a charge state of an energy storage device connected to the electric machine. The energy storage device may be present, for example, as a traction battery, by way of which electrical energy is provided for the electric machine, or temporarily stored. Alternatively, the energy storage device may be present in addition to the traction battery, for example, in the form of a buffer storage device in the form of a capacitor.

During the recuperation operation, kinetic energy may be converted into electrical energy by way of the electric machine. This electrical energy may be at least partially, or, in some embodiments, completely, fed to the energy storage device. The charge level of the energy storage device may indicate its absorption capacity. The target value may therefore be set as a function of the absorption capacity of the energy storage device. For example, the target value may be adjusted towards a value of zero if it is determined from the charge state that the absorption capacity of the energy storage device is no longer sufficient to absorb the electrical energy provided by the electric machine. In some embodiments, a target value of zero may be used when the energy storage device is fully charged. In such embodiments, the recuperation operation may preferably be ended or at least temporarily interrupted. This may enable a particularly reliable recuperation operation.

The disclosure further relates to a motor vehicle, in particular for carrying out the method according to the statements in the context of this description, having at least one electric machine, by way of which a recuperation torque aimed at decelerating the motor vehicle may be provided at least temporarily and set to a target value, and having an operating element, by way of which a default value for the recuperation torque may be selected from a plurality of default values, wherein the motor vehicle may be configured to determine the target value in a first recuperation operating mode as a function of the default value and in a second recuperation operating mode as a function of a driving speed of the motor vehicle, wherein the first recuperation operating mode may be carried out when a default value is selected on the operating element which corresponds to a recuperation torque other than zero. The motor vehicle may be further configured to switch from the first recuperation operating mode to the second recuperation operating mode when a default value is selected on the operating element which corresponds to a recuperation torque of zero, and additionally an accelerator pedal of the motor vehicle is actuated.

The advantages of such a design of the motor vehicle have already been pointed out. Both the motor vehicle and the method for operating it can be further refined in accordance with the statements in the context of this description, in respect of which reference is made to these statements.

The features and combinations of features described in the description, in particular the features and combinations of features described in the following description of the figures and/or shown in the FIGURES, can be used not only in the combination specified in each case, but also in other combinations or on their own, without departing from the scope of the disclosure. Thus, embodiments are also to be regarded as being encompassed by the disclosure that are not explicitly shown or explained in the description and/or the FIGURES, but which emerge from the embodiments explained through combinations of features or can be derived from them.

BRIEF DESCRIPTION OF THE SEVERAL VIEWS OF THE DRAWINGS

The FIGURE shows a schematic view of a motor vehicle.

DETAILED DESCRIPTION

The FIGURE shows a motor vehicle 1 with a drive device 2 that has an electric machine 3. Electric machine 3 may be at least temporarily coupled to at least one wheel axle 4 of motor vehicle 1. At least temporarily, a recuperation torque aimed at decelerating motor vehicle 1 may be provided by way of electric machine 3 in a recuperation operation. In the process, kinetic energy may be converted into electrical energy by way of electric machine 3. The electrical energy may preferably be fed to an energy storage device 5 that is connected to electric machine 3.

The recuperation torque provided by electric machine 3 may be set or regulated to a target value during the recuperation operation by way of a control instrument 6. Motor vehicle 1 may have at least one operating element 7 and at least one accelerator pedal 8. Control element 7 may be present, for example, as shift paddles arranged on a steering wheel, as a selector lever and/or as a multi-function display. The accelerator pedal 8 may be used to control a drive torque provided by drive device 2. Alternatively, the accelerator pedal 8 may be present as a brake pedal, which is present in addition to another accelerator pedal.

By way of operating element 7, a default value for the recuperation torque may be selected from a plurality of default values. The plurality of default values may include a first default value, which corresponds to a recuperation torque of zero, and at least one second default value, which corresponds to a recuperation torque other than zero. The default value may preferably be selected by gradual actuation of the operating element 7, wherein the default value for the recuperation torque is gradually increased or decreased.

At least two operating modes may be provided as part of the recuperation operation. In a first recuperation operating mode, the target value may be determined as a function of the default value. In some embodiments, the target value in the first recuperation operating mode may be set or regulated to the default value. In this respect, the recuperation torque in the first recuperation operating mode may be set to the default value selected by means of operating element 7.

In a second recuperation operating mode, the target value may be set as a function of a driving speed of motor vehicle 1. In this respect, the recuperation torque in the second recuperation operating mode may not be set to the default value. Rather, the target value may be set automatically regardless of the default value. For example, the target value may be set such that the driving speed is set to a target driving speed. The target driving speed may be determined, for example, from a setting of operating element 7. Additionally or alternatively, the target driving speed may be determined by a driver assistance device (not shown in detail). Preferably, the target driving speed may be set as a function of a driving speed of a vehicle driving ahead and/or may be adapted to a route.

Switching between the first recuperation operating mode and the second recuperation operating mode may take place as a function of the default value selected by way of operating element 7. The first recuperation operating mode may be carried out when a default value is selected on operating element 7 that corresponds to a recuperation torque other than zero.

Furthermore, the first recuperation operating mode may be switched to the second recuperation operating mode if a default value is selected on operating element 7 that corresponds to a recuperation torque of zero, and additionally the accelerator pedal 8 is actuated. In order to switch to the second recuperation operating mode, it is therefore not sufficient to select the corresponding default value on operating element 7. Rather, accelerator pedal 8 must be additionally actuated, at least briefly. In some embodiments, the selection of the default value corresponding to a recuperation torque of zero on operating element 7 is cancelled if accelerator pedal 8 is not actuated at least briefly within a certain period of time after the selection of this default value.

If accelerator pedal 8 is actuated during the recuperation operation, for example to decelerate or accelerate the motor vehicle, the recuperation operation may be interrupted at least temporarily. Thereafter, the recuperation operation may be continued in the previously selected recuperation operating mode as soon as accelerator pedal 8 is no longer actuated. Thus, even after a temporary interruption of the recuperation operation in the first recuperation operating mode by operating accelerator pedal 8, the first recuperation operating mode may be continued.

In addition, a third recuperation operating mode may be provided. For this purpose, a further default value for the recuperation torque may be selected on operating element 7, which corresponds to a higher recuperation torque than the default value. The third recuperation operating mode may be carried out when the driving speed exceeds the target driving speed. In this case, the target value may be determined as a function of said further default value. In particular, the target value may be set to said further default value until the driving speed reaches the target driving speed. Then, the system may switch to the first recuperation operating mode or to the second recuperation operating mode. Alternatively, the recuperation operating mode may cease as long as the driving speed is lower than the target driving speed.

German patent application no. 102023120572.2, filed Aug. 3, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a motor vehicle, which has at least one electric machine, the method comprising:

providing a recuperation torque by the at least one electric machine aimed at decelerating the motor vehicle at least temporarily;

setting the recuperation torque to a target value; and selecting a default value for the recuperation torque from a plurality of default values by an operating element, the plurality of default values including at least one default value corresponding to a recuperation torque of zero, wherein the target value is determined in a first recuperation operating mode as a function of the default value and in a second recuperation operating mode as a function of a driving speed of the motor vehicle, the method further comprising:

implementing the first recuperation operating mode when a default value is selected on the operating element which corresponds to a recuperation torque other than zero; and switching the first recuperation operating mode to the second recuperation operating mode when a default value is selected on the operating element which corresponds to the recuperation torque of zero and when an accelerator pedal of the motor vehicle is actuated.

2. The method according to claim 1, wherein the target value in the first recuperation operating mode is additionally set as a function of the driving speed.

3. The method according to claim 1, wherein the target value is set such that the driving speed is set to a target driving speed.

4. The method according to claim 3, wherein the target driving speed is determined from a setting of the operating element and/or from a driver assistance device.

5. The method according to claim 3, wherein the target value is determined as a function of a second default value for the recuperation torque when the driving speed is greater than the target driving speed.

6. The method according to claim 5, wherein the second default value is selected from the plurality of default values.

7. The method according to claim 3, further comprising:
   determining a driving speed difference between the driving speed of the motor vehicle and a driving speed of a vehicle traveling ahead; and
   setting the target driving speed as a function of the driving speed difference.

8. The method according to claim 1, further comprising:
   determining an angle of inclination of the motor vehicle; and
   setting the target value as a function of the angle of inclination.

9. The method according to claim 1, wherein the target value is set as a function of a charge state of an energy storage device connected to the electric machine.

10. A motor vehicle comprising:
   at least one electric machine configured to provide a recuperation torque aimed at decelerating the motor vehicle at least temporarily and to set the recuperation torque to a target value; and
   an operating element configured to select a default value for the recuperation torque from a plurality of default values, the plurality of default values including at least one default value corresponding to a recuperation torque of zero,
   wherein the motor vehicle is configured to determine the target value in a first recuperation operating mode as a function of the default value and in a second recuperation operating mode as a function of a driving speed of the motor vehicle,
   wherein the motor vehicle is configured to implement the first recuperation operating mode when a default value is selected on the operating element which corresponds to a recuperation torque other than zero, and
   wherein the motor vehicle is further configured to switch from the first recuperation operating mode to the second recuperation operating mode when a default value is selected on the operating element which corresponds to the recuperation torque of zero and when an accelerator pedal of the motor vehicle is actuated.

* * * * *